(12) United States Patent
Wakai et al.

(10) Patent No.: US 7,690,326 B2
(45) Date of Patent: Apr. 6, 2010

(54) SYSTEM AND METHOD FOR CONTROLLING COATING WIDTH OF ELECTRODE PLATE

(75) Inventors: Yutaka Wakai, Aichi (JP); Kaoru Okinaga, Wakayama (JP); Yukio Koike, Kanagawa (JP); Tomofumi Yanagi, Osaka (JP)

(73) Assignee: Panasonic Corporation, Osaka (JP)

( * ) Notice: Subject to any disclaimer, the term of this patent is extended or adjusted under 35 U.S.C. 154(b) by 438 days.

(21) Appl. No.: 11/727,207

(22) Filed: Mar. 23, 2007

(65) Prior Publication Data

US 2007/0248745 A1   Oct. 25, 2007

(30) Foreign Application Priority Data

Mar. 24, 2006  (JP)  ............................. 2006-083163

(51) Int. Cl.
    *B05C 11/00*  (2006.01)
(52) U.S. Cl. .................. 118/679; 118/683; 118/325; 118/419; 118/411; 118/315
(58) Field of Classification Search ................ 118/679, 118/683, 690, 325, 419, 411, 315
    See application file for complete search history.

(56) References Cited

FOREIGN PATENT DOCUMENTS

| JP | 2001-327906 | 11/2001 |
|----|-------------|---------|
| JP | 2002-025541 | 1/2002 |
| JP | 2005-183181 | 7/2005 |
| JP | 2005-216722 | 8/2005 |
| JP | 2005-216723 | 8/2005 |

*Primary Examiner*—Brenda A Lamb
(74) *Attorney, Agent, or Firm*—McDermott Will & Emery LLP

(57) ABSTRACT

A system for controlling the coating width of an electrode plate, The system includes: a coating device which ejects a paste at a predetermined width from each of a plurality of slit nozzles toward a fed core substrate to form a coating layer on the surface of the core substrate; a gap controlling device which controls the gap between the slit nozzles of the coating device and the core substrate; a coating width measuring device which measures the width of the coating layer on the surface of the core substrate; and a controlling unit which controls the gap controlling device based on the results obtained by comparing the measured coating width with a predetermined coating width. In this system, the stripe-shaped coating layer is formed without using a masking tape, and the width of the coating layer is controlled with high accuracy.

2 Claims, 6 Drawing Sheets

Prior Art

Prior Art

SYSTEM AND METHOD FOR CONTROLLING COATING WIDTH OF ELECTRODE PLATE

The present disclosure relates to subject matter contained in priority Japanese Patent Application No. 2006-83163 filed on Mar. 24, 2006, the contents of which is herein expressly incorporated by reference in its entirety.

BACKGROUND OF THE INVENTION

1. Field of the Invention

The present invention relates to a system and method for controlling coating width in an electrode plate manufacturing process in which a paste containing an active material is applied to a core substrate to form a stripe-shaped coating is layer.

2. Description of the Related Art

In recent years, batteries have been increasingly used as a power source of various devices. Accordingly, there has been a strong demand for an increase in the capacity and output power of batteries and for a reduction in the thickness and weight thereof. Lithium ion rechargeable batteries, lithium polymer rechargeable batteries, nickel metal hydride batteries, and the like have been used as batteries capable of satisfying the demand. These batteries are being improved to further increase the capacity and output power and also to reduce the cost and stabilize the life.

As an electrode plate for such batteries, there is known an electrode plate constituted by forming a coating layer containing an active material on one or both sides of a metal core substrate serving as a collector. The coating layer is formed by coating the surface of the core substrate with a paste containing the active material. In order to reduce manufacturing cost in a method for manufacturing such an electrode plate, various methods have been known (see, for example, Japanese Patent Laid-Open Publication Nos. 2001-327906, 2005-183181, 2005-216722, and 2005-216723). Specifically, while a strip-like core substrate is fed in its longitudinal direction, a plurality of stripes of a coating layer are formed so as to be separated in the width direction is of the core substrate with an uncoated portion serving as a lead portion formed between the stripes. After the coating layer is dried and compressed, the core substrate is subjected to cutting, whereby an electrode plate having a desired size is manufactured with high productivity.

As a method for forming stripes of a coating layer on the surface of a core substrate, there is known, for example, a method described as a conventional example in Japanese Patent Laid-Open Publication No. 2001-327906. In this method, as shown in FIG. 6A, a masking tape 32 is applied to a plurality of uncoated portion formation portions on a strip-like core substrate 31. While the core substrate 31 is fed in its longitudinal direction, a paste 34 is ejected from a slit nozzle of a die 33 having a width approximately the same as that of the core substrate 31 to coat almost the entire surface of the core substrate 31 with the paste 34 as shown in FIG. 6B. After the coating layer is dried, the masking tapes 32 are peeled from the core substrate 31. In this manner, as shown in FIG. 6C, a plurality of stripes of a coating layer 35 is formed on the surface of the core substrate 31, and an uncoated portion 36 is formed between the stripes and in the side end portions of the core substrate 31.

According to this method for forming a coating layer, the coating layer 35 can be formed with high width accuracy by using the masking tape 32. However, the masking tape 32 must is be used, and steps of applying and peeling the masking tape 32 must be provided, thereby increasing cost. Furthermore, since the masking tape 32 is exposed to high temperature in a drying furnace, the following problems arise. Wrinkles are formed in the core substrate 31 due to thermal shrinkage of the masking tape 32. The dimensional accuracy of the coating layer 35 is adversely affected. The adhesion of the masking tape 32 is increased, and thus cracks and breakage are likely to occur in the core substrate 31 when the masking tape 32 is peeled.

Similarly, there are also known the following methods which employ a masking tape. In a method described in Japanese Patent Laid-Open Publication No. 2005-183181, in order to prevent the occurrence of wrinkles and distortions in a core substrate due to roll pressing (compression) of a coating layer, the coating layer is formed such that the entire coating surface is flat after drying. Specifically, in order to make the coating thickness of the coating layer uniform over the entire width including both side edge portions, coating is performed such that the coating thickness on masking tapes is different from that on coated portions. In a method described in Japanese Patent Laid-open Publication No. 2005-216722, a paste is applied in stripes so as not to be applied to portions where a masking tape is placed, and the masking tape is peeled after roll pressing. In a method described in Japanese Patent Laid-Open Publication No. 2005-216723, a multilayered masking tape is employed in which each layer can be peeled layer by layer. An upper layer of the masking tape is peeled such that the entire coated surface after coating is flat, and the masking tape is peeled after roll pressing. However, a masking tape must be used, and steps of applying and peeling the masking tape must be provided. Therefore, the problem of cost increase cannot be solved.

In order to solve the problem, a method for manufacturing an electrode plate is disclosed in Japanese Patent Laid-open Publication No. 2001-327906. In this method, as shown in FIG. 7A, a core substrate 41 is fed with the rear surface thereof supported by a supporting member 44. The core substrate 41 and an application apparatus 42 having a plurality of slit nozzles 43 are arranged such that a gap is provided between the surface of the core substrate 41 and the slit nozzles 43. In this state, a paste 45 is ejected from each of the slit nozzles 43 toward the surface of the core substrate 41, whereby an electrode plate 47 having a plurality of stripes of a coating layer 46 applied to the core substrate 41 is manufactured, as shown in FIG. 7B.

Moreover, there is known an apparatus for manufacturing an electrode plate (see Japanese Patent Laid-Open Publication No. 2002-25541). In this apparatus, in order to prevent unevenness in the weight per unit area of a coating layer formed by coating a core substrate with a paste, the weight of the coating layer is measured after drying, and the amount of the paste to be supplied to a coating apparatus is controlled based on the measurement results.

This apparatus for manufacturing an electrode plate is described with reference to FIG. 8. A strip-like core substrate 51 is fed from an unwinder 52 to a coating unit 53, and the core substrate 51 travels while being wound on a support roller 54 of the coating unit 53. During this state, a paste 56 is ejected from a coating apparatus 55 toward the surface of the core substrate 51 to form a coating layer. Subsequently, the core substrate 51 is fed to a drying furnace 57 to dry the coating layer and then passes through a weight measuring apparatus 58. At this time, a plurality of radiations, such as beta rays and X-rays, having different penetration depths are applied, and the weight per unit area of the coating layer is measured separately from the weight of the core substrate based on the amount of the transmitted rays. The core substrate is then wound by means of a winding apparatus 59. A pump 61 for supplying the paste to the coating apparatus 55 is controlled by a controlling unit 60 based on the results obtained by comparing a predetermined standard weight with the weight measured by a weight measuring apparatus 58, whereby the unevenness of the weight of the coating layer is suppressed within a predetermined range, Meanwhile, as shown in FIGS. 7A and 7B, in the method in which the paste 45 is ejected from the coating apparatus 42 having the plurality of slit nozzles 43 to form the stripe-shaped coating layer 46 on the surface of the core substrate 41, the width of the coating layer 46 is basically controlled by the size of the slit nozzles 43. However, the width of the stripe-shaped coating layer 46 can change due to various causes of fluctuations, causing a problem that an electrode plate 47 having a coating layer 46 formed with high width accuracy is difficult to manufacture. For example, since the properties of the paste 45 are relatively easily changed, the weight per unit area of the coating layer is often changed even when the amount supplied from a supply pump is controlled to a constant value. Meanwhile, when the amount of the paste 56 supplied from the pump 61 is changed in order to make the weight per unit area of the coating layer uniform as shown in FIG. 8, the width of the coating layer is changed. Therefore, a problem arises in that it is difficult to accurately adjust the width of the coating layer to a constant value.

SUMMARY OF THE INVENTION

In light of the foregoing problems, it is an object of the present invention to provide a system and method for controlling the coating width of an electrode plate. In this system and method, a paste is ejected from a plurality of slit nozzles toward the surface of a core substrate to form stripes of a coating layer without using a masking tape, whereby the width of the coating layer is controlled with high accuracy, One aspect of the present invention is a system for controlling a coating width of an electrode plate in a process of manufacturing the electrode plate by coating a strip-like core substrate with a paste containing an active material to form a stripe-shaped coating layer. The system comprises: a feeding device which feeds the core substrate in its longitudinal direction; a coating device which ejects the paste at a predetermined width from each of a plurality of slit nozzles toward the fed core substrate to form the coating layer on a surface of the core substrate; a gap controlling device which controls a gap between the slit nozzles of the coating device and the core substrate; a coating width measuring device which measures the width of the coating layer on the surface of the core substrate; and a controlling unit which controls the gap controlling device based on results obtained by comparing the measured coating width with a predetermined coating width. The plurality of slit nozzles may be one nozzle having a plurality of slits or may be composed of a plurality of slit nozzles.

The present invention has been devised by focusing attention on the fact that, even when the gap between a coating device and the surface or a core substrate changes slightly, the width of a coating layer changes largely. For example, even when the gap is changed by about 10 μm, the width is changed by about 1 mm. In the above configuration, after a coating layer is formed by coating, the width of the coating layer is measured by the coating width measuring device. The gap between the coating device and the core substrate is adjusted based on the results obtained by comparing the measurement results with a predetermined coating width, whereby the width of the coating layer is feedback-controlled with high accuracy. Hence, an electrode plate having a stripe-shaped coating layer formed with high width accuracy is manufactured with high productivity and at low cost without using a masking tape.

Preferably, the coating device is provided with a supply pump which supplies the paste to the slit nozzles, and a weight measuring device for measuring the weight per unit area of the coating layer is provided downstream of a drying furnace for drying the coating layer. The controlling unit controls the supply pump based on results obtained by comparing a predetermined weight with measurement results measured by the weight measuring device. In this manner, the weight per unit area of the coating layer is also controlled and adjusted within a predetermined range, and the coating width change caused by the change in the supply amount of the paste is eliminated as described above. Therefore, a plate electrode in which the width and the weight per unit area of the stripe-shaped coating layer are adjusted with high accuracy is manufactured with high productivity and at low cost.

Another aspect of the present invention is a method for controlling a coating width of an electrode plate. The method comprises; feeding a strip-like core substrate in its longitudinal direction and ejecting a paste at a predetermined width from each of a plurality of slit nozzles toward the fed core substrate to form a stripe-shaped coating layer on a surface of the core substrate; measuring the weight per unit area of the coating layer on the core substrate after the coating layer is dried; controlling the amount of the paste to be supplied to the slit nozzles based on results obtained by comparing the weight measurement results with a predetermined weight; measuring the width of the coating layer on the surface of the core substrate; and adjusting a gap between the slit nozzles and the core substrate based on results obtained by comparing the measured coating width with a predetermined coating width, wherein the supply amount of the paste and the gap between the slit nozzles and the core substrate are adjusted such that the weight per unit area of the coating layer and the coating width of the coating layer are respective predetermined values.

In this configuration, while the weight per unit area of the coating layer is adjusted within a predetermined range, the width of the coating layer is adjusted to a predetermined width with high accuracy. Therefore, an electrode plate in which the width and the weight per unit area of the stripe-shaped coating layer are adjusted with high accuracy is manufactured with high productivity and at low cost.

The foregoing and other objects and features of the present invention will become more apparent from the following detailed description and the accompanying drawings.

DETAILED DESCRIPTION OF THE PREFERRED EMBODIMENTS

Hereinafter, an embodiment of an electrode plate coating width controlling system of the present invention is described with reference to FIGS. 1 to 5.

Figure 1:
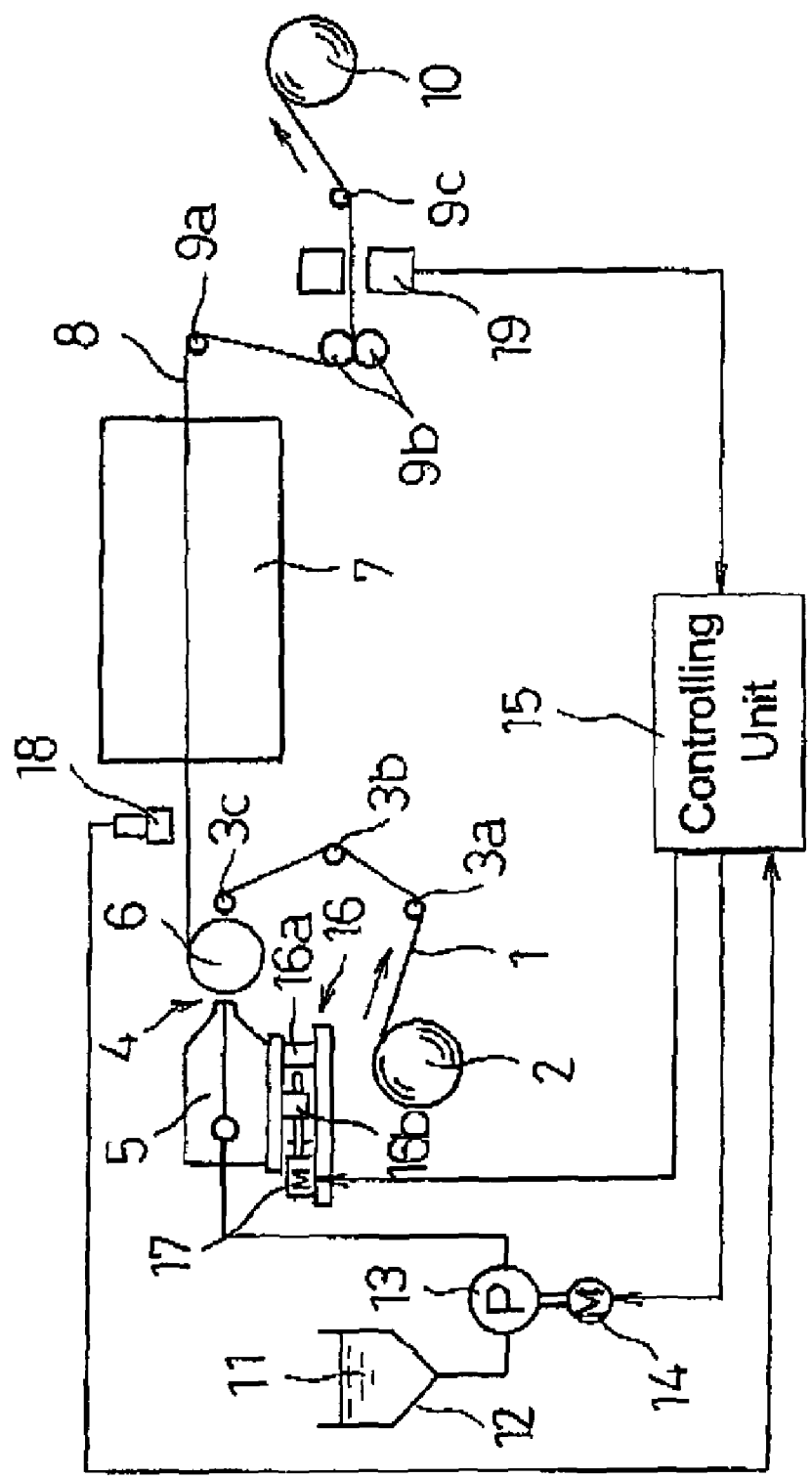
FIG. 1 is a configuration diagram of an embodiment of an electrode plate manufacturing system to which an electrode plate coating width controlling system of the present invention is applied.

FIG. 1 shows an embodiment of an electrode plate manufacturing system to which the electrode plate coating width controlling system of the present invention is applied. In FIG. 1, a core substrate 1 formed of strip-like metal foil is is wound into a coil shape and is attached to an unwinder 2. The core substrate 1 is unwound from the unwinder 2 and is fed to a coating unit 4 through guide rollers 3a to 3c. The coating unit 4 is provided with: a coating device 5 which ejects a paste 11 containing an active material toward the surface of the core substrate 1; and a supporting roller 6 which supports the rear surface of the core substrate 1 and is disposed so as to face the coating device 5. A coating layer is formed on the surface of the core substrate 1 in the coating unit 4, and this core substrate 1 is fed to a drying furnace 7. In the drying furnace 7, the coating layer is dried to form a strip-like electrode plate 8. The strip-like electrode plate 8 fed from the drying furnace 7 is wound into a coil form on a winder 10 through guide rollers 9a to 9c.

The paste 11 is supplied from a hopper 12 containing the paste 11 to the coating device 5 by means of a supply pump 13. A motor 14 for driving the supply pump 13 is controlled by a controlling unit 15. Furthermore, a gap controlling device 16 is provided for controlling the position of the coating device 5 to adjust the gap between the coating device 5 and the surface of the core substrate 1. A motor 17 for driving the gap controlling device 16 is controlled by the controlling unit 15. The gap controlling device 16 is composed of: a slide guide 16a which supports the coating device 5 so as to be movable away from or toward the supporting roller 6; and a screw feeding mechanism 16b which moves the coating device 5. The gap is adjusted by rotating the screw forward or backward by means of the motor 17.

A coating width measuring apparatus 18 for measuring the width of the coating layer formed on the surface of the core substrate 1 is provided between the coating unit 4 and the drying furnace 7, and the measurement data of the measuring apparatus 18 is inputted to the controlling unit 15. In this embodiment, the coating width measuring apparatus 18 is composed of a camera for image recognition of the coating layer on the surface of the core substrate 1 and recognizes the core substrate and coated portions from the captured image to thereby measure the width of the stripe-shaped coated portions and the spacing therebetween. When the coating width measuring apparatus 18 is disposed downstream of the drying furnace 7, the same effects as those of this embodiment can be obtained.

A weight measuring apparatus 19 for measuring the weight per unit area of the coating layer is provided between the drying furnace 7 and the winder 10, and the measurement data is inputted to the controlling unit 15. In this embodiment, a weight measuring apparatus described in Japanese Patent Laid-Open Publication No. 2002-25541 is used as the weight measuring apparatus 19. In the weight measuring apparatus 19, a plurality of radiations, such as beta rays and X-rays, having different penetration depths are applied, and the weight per unit area of the coating layer is determined separately from the weight of the core substrate 1 based on the amount of the transmitted rays.

Figure 2A:
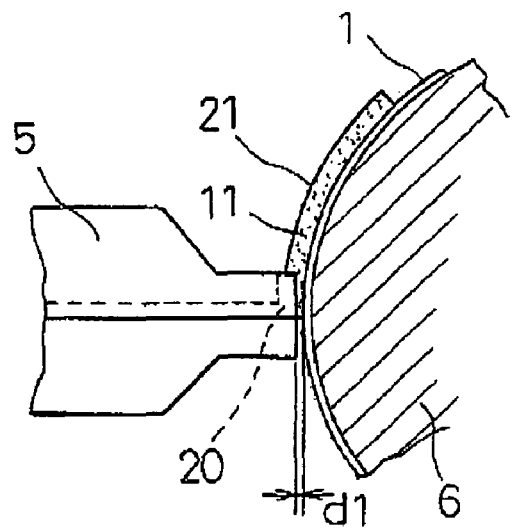
FIGS. 2A and 2B are views illustrating a state in which the gap between a coating device and a core substrate is small in the embodiment, FIG. 2A being a side view of the coating layer, FIG. 2B being a front view.
Figure 2B:
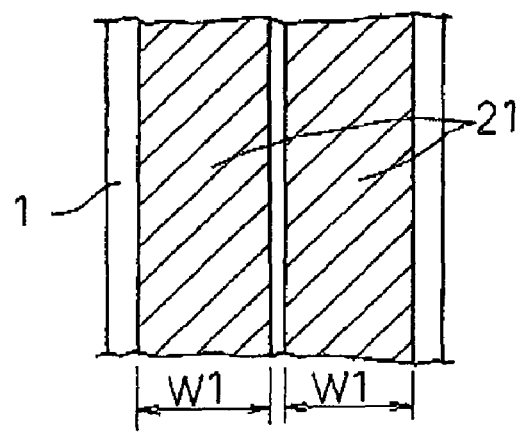
Figure 3A:
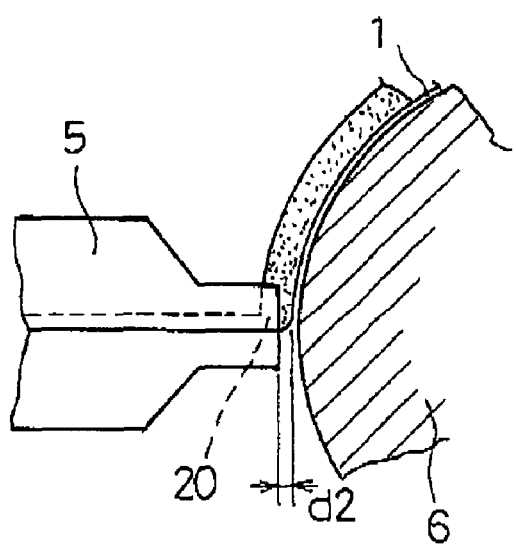
FIGS. 3A and 3B are views illustrating a state in which the gap between the coating device and the core substrate is large in the embodiment, FIG. 3A being a side view of the coating layer, FIG. 3B being a front view.
Figure 3B:
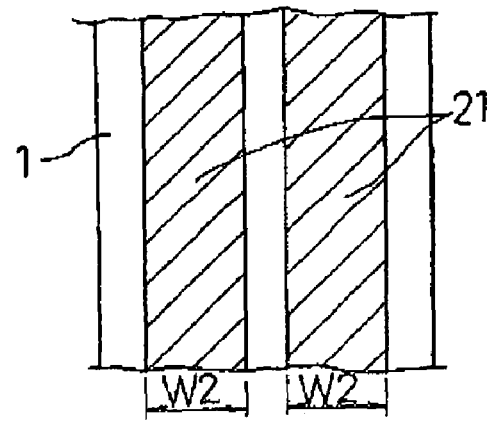

As shown in FIGS. 2A and 2B, a plurality of slit nozzles 20 having a width corresponding to the width of a coating layer 21 to be formed is provided to the coating device 5. The paste 11 is ejected from the slit nozzles 20 toward the surface of the core substrate 1 which is fed with the rear surface thereof supported by the supporting roller 6, whereby stripes of the coating layer 21 are formed on the surface of the core substrate 1. FIG. 2A shows a state in which the gap between the coating device 5 and the surface of the core substrate 1 is d1. In this case, when the width of the coating layer 21 is set to w1 as shown in FIG. 2B, and the gap between the coating device 5 and the surface of the core substrate 1 is increased to d2 as shown in FIG. 3A, the width of the coating layer 21 is decreased to w2 as shown in FIG. 3B. On the contrary, when the gap d is decreased, the width w is increased. Even when the change of the gap d (which is d2-d1) is about 10 μm, the change of the width w (which is w1-w2) of the coating layer 21 is about 1 mm. Therefore, by adjusting the gap d between the coating device 5 and the surface of the core substrate 1, the width w of the coating layer 21 is controlled efficiently and reliably.

As described above, in the coating unit 4, the paste 11 is ejected from the slit nozzles 20 of the coating device 5 onto the surface of the core substrate 1 which is moved while being supported by the supporting roller 6, and the stripe-shaped coating layer 21 is formed on the surface of the core substrate 1. Subsequently, the width of the coating layer 21 is measured when the core substrate 1 having the coating layer 21 passes through the coating width measuring apparatus 18.

The measurement data obtained by the coating width measuring apparatus 18 is inputted to the controlling unit 15. In the controlling unit 15, the measurement results are compared with a predetermined width. The gap controlling device 16 is controlled based on the comparison results to adjust the gap between the coating device 5 and the core substrate 1, and thus the width of the coating layer 21 is feedback-controlled with high accuracy. Consequently, the electrode plate 8 having the stripe-shaped coating layer 21 formed with high width accuracy is manufactured with high productivity and at low cost without using a masking tape.

Next, with reference to FIGS. 1 and 4A to 4C, a description is given of a controlling method for manufacturing the electrode plate 8 in this embodiment. In the electrode plate 8, the width and the weigh per unit area of the stripe-shaped coating layer 21 are controlled with high accuracy.

Figure 4A:
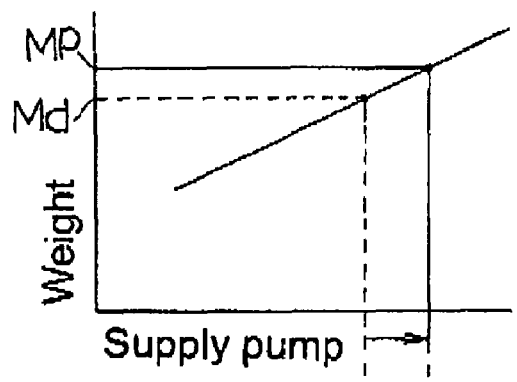
FIGS. 4A to 4C are characteristic diagrams for describing a method for adjusting the weight and width of the coating layer in the embodiment.

As described above, the core substrate 1 having the stripe-shaped coating layer 21 formed on the surface thereof passes through the drying furnace 7, and the coating layer 21 is dried in the drying furnace 7, whereby the electrode plate 8 having the stripe-shaped coating layer 21 is formed. When the strip-like electrode plate 8 passes through the weight measuring apparatus 13, the weight per unit area of the dried coating layer 21 is measured, and the measurement data is inputted to the controlling unit 15. In the control unit, the weight measurement result Md is compared with a predetermined weight Mp as shown in FIG. 4A. The number of revolutions of the supply pump 13 for supplying the paste 11 is controlled based on the comparison result such that the weight per unit area of the coating layer 21 becomes the predetermined weight Mp. In FIG. 4A, the measured weight Md is less than the predetermined weight Mp. Thus, the number of revolutions of the supply pump 13 is increased to increase the supply amount of the paste 11.

Figure 4B:
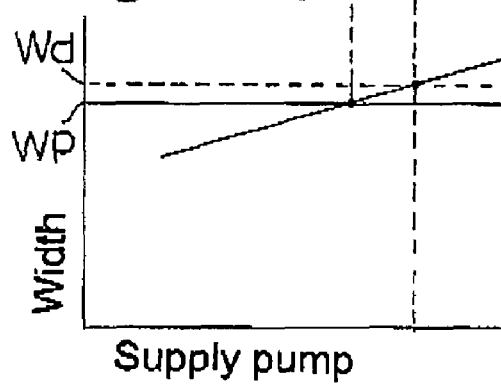
Figure 4C:
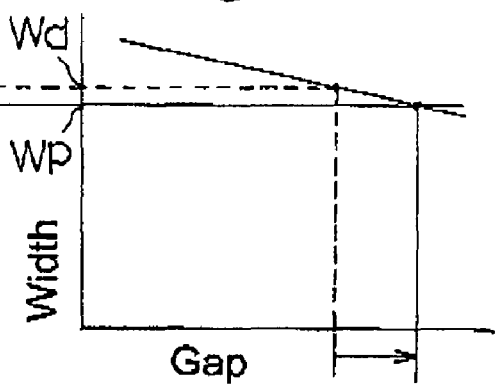

Then, as shown in FIG. 4B, the measured width wd of the coating layer 21 is changed and becomes larger than a predetermined width wp. Thus, as shown in FIG. 4C, the gap w is increased by means of the gap controlling device 16 to adjust the measured width wd to the predetermined width wp. Hence, by adjusting the supply amount of the paste 11 and the gap d between the slit nozzles 20 and the core substrate 1, the electrode plate 8 is manufactured in which the weight per unit area of the coating layer 21 and the width w of the coating layer 21 are respective predetermined values.

Figure 5:
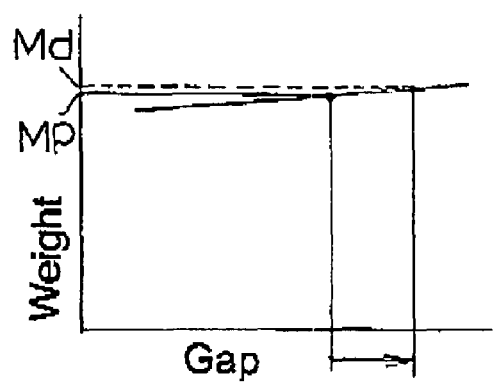
FIG. 5 is a characteristic diagram showing the weight change of the coating layer due to the change of gap width.
Figure 6A:
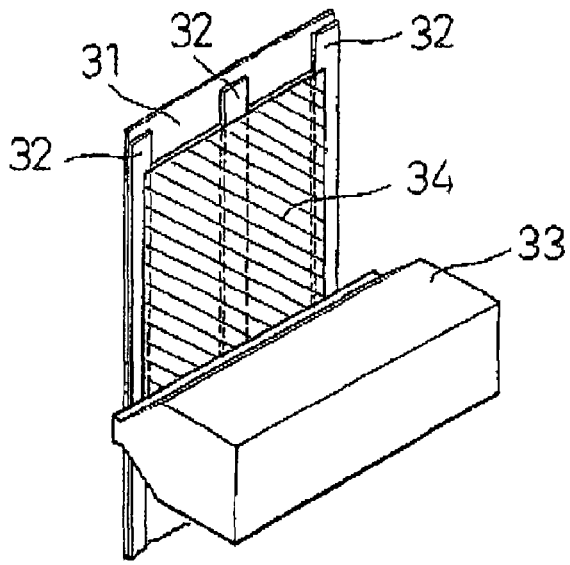
FIGS. 6A to 6C show a stripe-shaped coating layer forming method of a first conventional example, FIG. 6A being a perspective view illustrating a coating process, FIG. 6B being a front view and a cross-sectional view illustrating a state of a coated core substrate, FIG. 6C being a front view and a cross-sectional view illustrating the core substrate having a coating layer formed thereon.
Figure 6B:
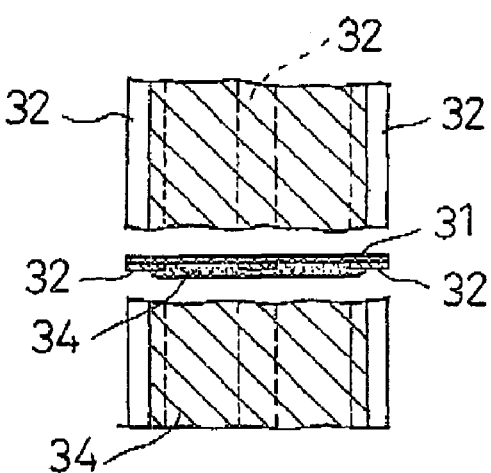
Figure 6C:
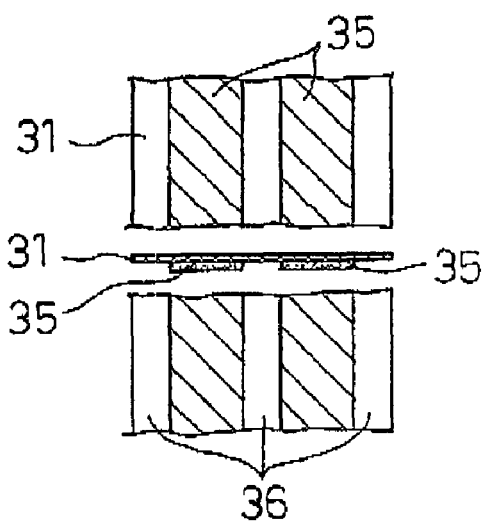
Figure 7A:
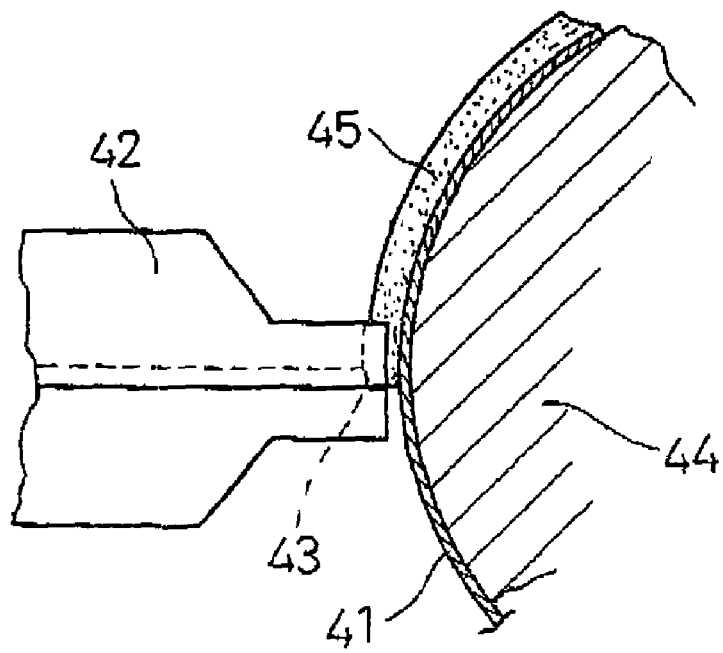
FIGS. 7A and 7B shows a stripe-shaped coating layer forming method of a second conventional example, FIG. 7A being a side view illustrating a coating process, FIG. 7B being a front view and a cross-sectional view of a core substrate having the coating layer formed thereon.
Figure 7B:
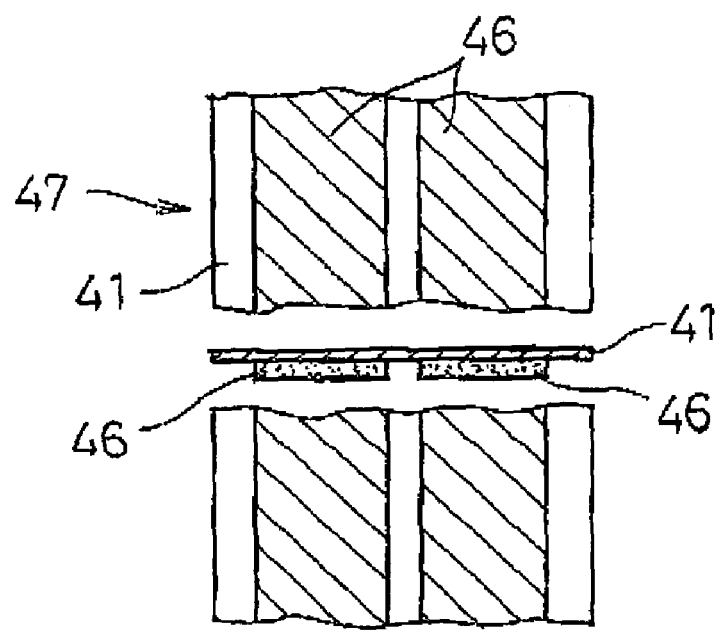
Figure 8:
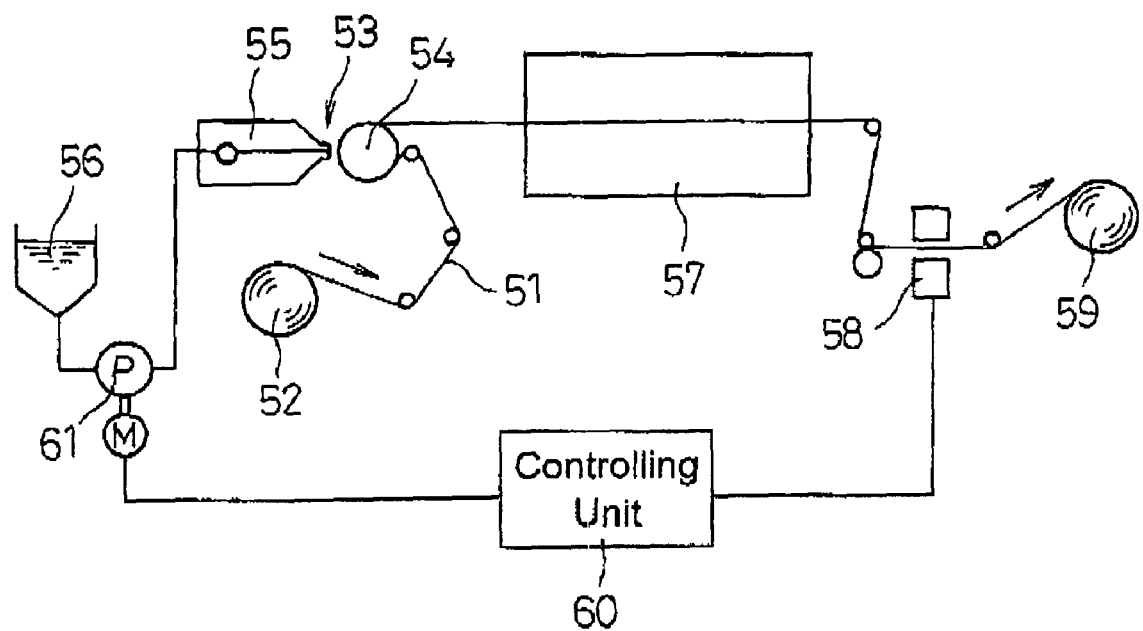
FIG. 8 is a configuration diagram of an electrode plate manufacturing system of a third conventional example.

When the gap d is changed as shown in FIG. 4C, the weight M per unit area of the coating layer 21 is affected as shown in FIG. 5. When the gap d is increased, the supply amount of the paste 11 is increased to increase slightly the weight M as shown in the illustrated example. Thus, by repeating the controlling procedure shown in FIGS. 4A to 4C, the number of revolutions of the supply pump 13 and the gap d converge to values which provide a coating layer 21 having the predetermined weight and width.

As described above, according to this embodiment, while the weight per unit area of the coating layer 21 is adjusted within a predetermined range, the width of the coating layer 21 is adjusted to a predetermined width with high accuracy.

The electrode plate 8 in which the width and the weight per unit area of the stripe-shaped coating layer 21 are controlled with high accuracy is manufactured with high productivity and at low cost.

In the electrode plate coating width controlling system of the present invention, the width of the coating layer is measured by the coating width measuring apparatus, and the gap between the coating device and the core substrate is adjusted based on the measurement results, whereby the width of the coating layer is feedback-controlled with high accuracy.

Thus, an electrode plate in which the width of a stripe-shaped coating layer is controlled with high accuracy is manufactured with high productivity and at low cost. The present system is therefore useful for manufacturing an electrode plate for various batteries such as lithium ion rechargeable batteries, lithium polymer rechargeable batteries, and nickel metal hydride batteries.

While preferred embodiments of the invention have been described using specific terms, such description is for illustrative purposes only, and it is to be understood that changes and variations may be made without departing from the spirit or scope of the following claims.

What is claimed is:

1. A system for controlling a coating width of an electrode plate in a process of manufacturing the electrode plate by coating a strip-like core substrate with a paste containing an active material to form a stripe-shaped coating layer, the system comprising:
    a feeding device which feeds the core substrate in a longitudinal direction thereof;
    a coating device which ejects the paste at a predetermined width from each of a plurality of slit nozzles toward the fed core substrate to form the coating layer on a surface of the core substrate;
    a gap controlling device which controls a gap between the slit nozzles of the coating device and the core substrate;
    a coating width measuring device which measures the width of the coating layer on the surface of the core substrate; and
    a controlling unit which controls the gap controlling device based on results obtained by comparing the measured coating width with a predetermined coating width.

2. The system for controlling a coating width of an electrode plate according to claim 1, wherein:
    the coating device is provided with a supply pump which supplies the paste to the slit nozzles;
    a weight measuring device for measuring the weight per unit area of the coating layer is provided downstream of a drying furnace for drying the coating layer; and
    the controlling unit controls the supply pump based on results obtained by comparing a predetermined weight with measurement results measured by the weight measuring device.

* * * * *